US012669210B2

(12) United States Patent　(10) Patent No.:　US 12,669,210 B2
Kiest, Jr. et al.　(45) Date of Patent:　Jun. 30, 2026

(54) SYSTEMS AND METHODS FOR LINING A PIPE WITH A LIGHTED LINER OR BLADDER

(71) Applicant: PIPE LINING ENTERPRISES, INC., Fort Lauderdale, FL (US)

(72) Inventors: Larry W. Kiest, Jr., Fort Lauderdale, FL (US); Matthew Linton, Fort Lauderdale, FL (US)

(73) Assignee: PIPE LINING ENTERPRISES, INC., Fort Lauderdale, FL (US)

( * ) Notice: Subject to any disclaimer, the term of this patent is extended or adjusted under 35 U.S.C. 154(b) by 583 days.

(21) Appl. No.: 18/172,767

(22) Filed: Feb. 22, 2023

(65) Prior Publication Data

US 2023/0279982 A1　Sep. 7, 2023

Related U.S. Application Data

(60) Provisional application No. 63/268,335, filed on Feb. 22, 2022.

(51) Int. Cl.
*F16L 55/165*　(2006.01)
*B29C 35/08*　(2006.01)

(52) U.S. Cl.
CPC ....... *F16L 55/1654* (2013.01); *F16L 55/1656* (2013.01); *B29C 2035/0827* (2013.01)

(58) Field of Classification Search
CPC .............. F16L 55/1656; F16L 55/1654; F16L 55/1652; F16L 55/165; F16L 11/12; E03F 2003/065
See application file for complete search history.

(56) References Cited

U.S. PATENT DOCUMENTS

| 4,135,958 | A | 1/1979 | Wood | |
| 5,407,630 | A | 4/1995 | Smith | |
| 6,478,054 | B1 * | 11/2002 | Kiest | B29C 63/36 |
| | | | | 156/287 |
| 7,311,121 | B2 * | 12/2007 | Kamiyama | E21B 41/0042 |
| | | | | 264/269 |

(Continued)

FOREIGN PATENT DOCUMENTS

| CN | 108574364 A | 9/2018 |
| CN | 110943276 A | 3/2020 |

(Continued)

*Primary Examiner* — Kenneth Rinehart
*Assistant Examiner* — Haotian Lu
(74) *Attorney, Agent, or Firm* — McKee, Voorhees & Sease, PLC

(57)　ABSTRACT

Cured-in-place pipe lining repair is a way to access and repair a pipe or pipe section in a trenchless manner. A resinous material is positioned in a pipe and is cured, which creates a repaired wall or surface for the pipe. A light curable resin can be cured with the introduction of illumination in the pipe, such as via a light source. To aid in reducing the curing time for the resin, a liner saturated with the resin, a scrim, and/or a bladder used to press the resin towards the wall of the pipe can be manufactured with a light source, such as one or more fiber optic lines or strings. The lights can be incorporated along the full length of the pipe being repaired and activated along the length to cure the resin along the length at the same time, which reduces the time needed for curing.

19 Claims, 6 Drawing Sheets

(56) References Cited

U.S. PATENT DOCUMENTS

| | | |
|---|---|---|
| 9,188,289 B2 | 11/2015 | Peil et al. |
| 10,337,659 B2 | 7/2019 | Kuzniar |
| 10,343,338 B2 | 7/2019 | Kuzniar |
| 10,611,059 B2 | 4/2020 | Kuzniar |
| 11,118,716 B2 | 9/2021 | Kanres |
| 11,391,406 B2 | 7/2022 | Dahl-Nielsen et al. |
| 2006/0137816 A1 | 6/2006 | Taylor et al. |
| 2007/0037462 A1* | 2/2007 | Allen .................. G01M 11/086 442/5 |
| 2010/0051168 A1 | 3/2010 | Moeskajer et al. |
| 2010/0154187 A1 | 6/2010 | Kamiyama et al. |
| 2011/0186205 A1 | 8/2011 | Kamiyama et al. |
| 2011/0188203 A1 | 8/2011 | Smith |
| 2013/0010460 A1 | 1/2013 | Peil et al. |
| 2014/0133634 A1 | 5/2014 | Kaufmann et al. |
| 2016/0131298 A1 | 5/2016 | Schleicher |
| 2016/0270945 A1* | 9/2016 | Tomblin .................. A61F 13/04 |
| 2017/0122481 A1 | 5/2017 | Czaplewski et al. |
| 2019/0170276 A1 | 6/2019 | Hilgers et al. |
| 2020/0003354 A1 | 1/2020 | Kanres |
| 2020/0049301 A1* | 2/2020 | Rasmussen ........... F16L 55/179 |
| 2020/0166172 A1 | 5/2020 | Liu et al. |
| 2020/0224812 A1 | 7/2020 | Krasowski |
| 2020/0300403 A1* | 9/2020 | Taylor ................. F16L 55/1651 |
| 2021/0172556 A1 | 6/2021 | Dahl-Nielsen et al. |
| 2021/0293367 A1 | 9/2021 | Vogt et al. |
| 2022/0023914 A1 | 1/2022 | Lokkinen |
| 2022/0205578 A1 | 6/2022 | Larsson |

FOREIGN PATENT DOCUMENTS

| | | | |
|---|---|---|---|
| CN | 113447004 A | 9/2021 | |
| CN | 114639521 A | 6/2022 | |
| DE | 19758429 A1 * | 7/1998 | ............ F16L 55/179 |
| DE | 102010035837 A1 * | 3/2012 | ............ F16L 55/165 |
| DE | 102018116311 A1 | 1/2020 | |
| DE | 102020109410 A1 | 10/2021 | |
| DE | 102020109411 A1 | 10/2021 | |
| DK | 180506 B1 | 6/2021 | |
| EP | 3705770 A1 | 9/2020 | |
| EP | 3795880 A1 | 3/2021 | |
| EP | 3543584 B9 | 8/2021 | |
| JP | 2007220334 A | 8/2007 | |
| JP | 2008175381 A | 7/2008 | |
| KR | 200374175 Y1 | 1/2005 | |
| KR | 101400380 B1 | 5/2014 | |
| KR | 101861645 B1 | 5/2018 | |
| WO | 1993015131 A2 | 8/1993 | |
| WO | WO-9851960 A1 * | 11/1998 | ............ B29C 63/34 |
| WO | 2004104469 A1 | 12/2004 | |
| WO | 2017051235 A1 | 3/2017 | |
| WO | 2021198472 A1 | 10/2021 | |
| WO | 2021198477 A1 | 10/2021 | |

* cited by examiner

SYSTEMS AND METHODS FOR LINING A PIPE WITH A LIGHTED LINER OR BLADDER

CROSS REFERENCE TO RELATED APPLICATIONS

This application claims priority under 35 U.S.C. § 119 to provisional patent application U.S. Ser. No. 63/268,335, filed Feb. 22, 2022. The provisional patent application is herein incorporated by reference in its entirety, including without limitation, the specification, claims, and abstract, as well as any figures, tables, appendices, or drawings thereof.

FIELD OF THE INVENTION

The invention relates generally to pipe repair. More particularly, but not exclusively, the invention relates to systems, methods, and/or apparatus for cured-in-place pipe (CIPP) repair using a curable resin that is light cured with an illuminated liner and/or bladder for curing the resin within the pipe being repaired.

BACKGROUND OF THE INVENTION

Many municipalities have buried infrastructure. Sewer systems are a buried infrastructure that provides access points such as manhole and cleanouts. The main sewer pipe extends between an upstream and a downstream manhole, and a number of service pipes extend laterally from the main pipes. These service/lateral pipes may extend to existing structures, such as buildings (residential, business, etc.). In many instances, the pipe systems are aged and require repair. Trenchless pipe repair methods are commonly used to repair or renew the pipe by accessing the pipe through access points. This access may also be used for installing conduits or cables to and through pipelines and avoiding the need for excavation.

Over the last 50 years, the rehabilitation method for old crumbling and leaking pipelines has changed from excavation and replacement of old pipeline to using low disruptive, low cost, very fast, and effective cured-in-place-pipe (CIPP) technology. The technology concept includes using the old pipe as a form or mold for the installation of a liner to create a new pipe. The technique includes, first cleaning the existing pipeline, manufacturing a fabric tube to fit the existing pipe, saturating the fabric tube with a thermoset resin, temporarily stopping all flow from entering the old pipe, installing the saturated fabric tube into the existing pipeline, curing the thermoset resin using a variety of techniques, and then restoring flow to the rehabilitated pipeline. In particular, a main pipe is lined first, and the lateral pipes connected to the main pipe need to be plugged.

Since its invention and early installation, CIPP technology has been improved with new innovations, applications, better materials, more efficient delivery and installation methods, and faster and diversified curing techniques.

CIPP is one such technique that includes rehabilitating an existing sewer system by creating a new pipe within an existing pipe. A liner, impregnated with a resinous material capable of curing and hardening, is inverted, pulled or pushed into a damaged pipe. The liner is pressed against the wall of the existing pipe, such as the liner having an impermeable membrane is inflated, or an elongated bladder is inflated, and the resinous material is allowed to cure and harden. The result is a replacement pipe having the older pipe or "host pipe" on the exterior. The cured-in-place pipe acts to alleviate the problems caused by structural defects and leakage in the existing sewer pipe system. Even in sewer systems where the main pipes have been rehabilitated with a cured-in-place pipe or other pipe liners, problems still arise.

Conventional sewer lines include a main pipe which extends along the street in a direction parallel to the street. Each house has a lateral pipeline that extends from the home and connects to the main pipeline. U.S. Pat. No. 9,562,339 provides a way in which the lateral pipe is lined using CIPP from a main pipe, which connects to a manhole. Still other patents, such as U.S. Pat. Nos. 9,435,479 and 8,550,121, among others, disclose lining processes.

It is often desirable to provide a clean-out to the lateral pipe adjacent the main sewer pipe. Many lateral pipes have been buried without such a clean-out. One method to provide a clean-out is to make a wide and extensive excavation so that persons can enter the excavation and attach a clean-out pipe to the lateral pipe. This results in considerable disruption to the soil and the yard around the house. Another option utilizes minimally invasive methods, for example, U.S. Pat. Nos. 9,151,410 and 6,705,801 are but some of the ways in which a clean-out is provided to a pipe.

CIPP utilizes a liner tube or tubes saturated with a curable resin, to repair the pipe. In some configurations, a curable resin is applied or otherwise positioned in the pipe without the use of a liner. In either case, the resin is cured, such as via heat, time, or light. Heat and light can increase the curing, which reduces the time needed for the resin to cure. With heat, steam is generally used and may displace volatile organic compounds (VOCs), such as styrene, which are pollutants and can then be released from the pipe system. This is undesirable.

Light curing resins are generally cured by the introduction of light, such as light emitting diodes (LEDs). In a sewer pipe, a light train or lighted robot can be moved through the pipe system at a predetermined rate of speed necessary to effectively cure the resin for the length of the pipe being repaired. However, the light must be exposed to the resin for sufficient time to cure the resin. With pipes of any sufficient distance, the process can be time consuming to make sure that the resin is cured to sufficient levels. The closer the light is to the resin, the more effective the level of cure. Thickness of the liner will also require additional time for the light to be in contact with the resin saturated liner. Liner thickness can also be a limitation for light curing as the backside of the liner does not receive the same level of light as the surface of the liner in direct contact with the light source.

While there have been some efforts to improve light curing in pipes, problems still exist. For example, it is known to insert lights, such as that disclosed in U.S. Pat. No. 11,566,742 and U.S. Patent Publication No. 2020/0300403. Other disclosures include additional use of UV lights to cure resinous materials in pipe systems. However, it is noted that in such disclosures, the lights or light systems are inserted into an open, proximal end of the bladder and liner. In addition, the elongated light structures and centering device are generally heavy. The additional weight and additional friction of the light system requires additional inflation pressure to cause the liner to invert into the pipe. This often requires more pressure than would be needed to simply invert the liner/bladder combination, as the length of bladder can be long. The increased inflation/inversion pressure causes the liner to stretch and elongate in the pipe. The elongated liner is often unacceptable as in lateral service pipe rehabilitation whereby a liner must terminate at an exact location otherwise the liner will stretch past a cleanout or even mistakenly cover a branch pipe. The stretched liner further results in thinning of the liner causing reduced physical properties and the liner not meeting minimum liner thickness requirements. Thus, the pipe may not be structurally sound along the full length of repair.

Thus, there exists a need in the art for systems, methods, and/or apparatus that reduce the inflation/inversion pressures and reduce the amount of curing time for a light curing resin used with a CIPP process.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage of the invention to rehab and/or repair an existing pipe of a pipe system, such as a sewer lateral pipe and/or a main pipe of a sewer system.

It is still yet a further object, feature, and/or advantage to reduce the time for curing resin used with a CIPP system to repair a pipe or pipe section.

It is still yet a further object, feature, and/or advantage to reduce inflation/inversion pressure while light curing a curable resin in a pipe, such as in a pipe liner.

It is another object, feature, and/or advantage to utilize fiber optics with a pipe liner and/or inflatable bladder that illuminates the full section of pipe being repaired with a light curable resin.

It is an object, feature, and/or advantage of at least some aspects of some embodiments to reduce, minimize, or even eliminate the need for a power source in the pipe for use with light curing a resinous material in a pipe system.

It is yet another object, feature, and/or advantage to manufacture a liner for lining a pipe via CIPP that incorporates lights, fiber optics, or other illuminating fiber or other apparatus along the length of the liner to aid in curing a resin associated with the liner for pipe repair.

It is still another object, feature, and/or advantage to incorporate a scrim with lights, such as fiber optic strings, to use with a liner and/or bladder for the pipe repair using CIPP.

It is another object, feature, and/or advantage to incorporate lights, such as fiber optics, LEDs, or the like, with a bladder used for CIPP repair.

The systems, apparatus, and/or methods disclosed herein can be used in a wide variety of applications. For example, any pipe (e.g., manhole, main pipe, lateral pipe, cleanout, etc.) could be used with the disclosed. In addition, the type of CIPP could vary as well, and could include, inversion, pull-in-place, saturated liner, extrusion, spray, or the like.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of a liner, bladder, and/or scrim which accomplish some or all of the previously stated objectives.

The liners, bladders, and/or scrims can be incorporated into systems or kits that accomplish some or all of the previously stated objectives.

According to some aspects of the present disclosure, a system for repairing one or more pipes of a pipe system includes a liner, said liner comprising one or more strands of fiber optic lights associated therewith and extending substantially the same length as said liner; a light curable resin associated with the liner; and a light source for activating the one or more strands of fiber optic lights while the liner and light curable resin are positioned in the one or more pipes to aid in curing said light curable resin.

According to at least some aspects and/or embodiments, the one or more strands of fiber optic lights are woven into the liner.

According to at least some aspects and/or embodiments, the liner comprises a felt liner.

According to at least some aspects and/or embodiments, the liner comprises a glass liner.

According to at least some aspects and/or embodiments, the light curable resin is saturated into the liner.

According to at least some aspects and/or embodiments, the system further comprises an inflatable bladder for pressing the liner and light curable resin towards a wall of the one or pipes.

According to at least some aspects and/or embodiments, the bladder comprises one or more strands of fiber optic lights along the length of the bladder to aid in the curing of the light curable resin.

According to at least some aspects and/or embodiments, the liner comprises a glass liner.

According to at least some aspects and/or embodiments, the one or more strands of fiber optic lights comprise glass.

According to at least some aspects and/or embodiments, the one or more strands of fiber optic lights comprise plastic.

According to at least some aspects, a system for repairing one or more pipes of a pipe system includes a liner comprising a plurality of lights spaced along a length of the liner; a light curable resin associated with the liner; and a power source for activating the one or more strands of fiber optic lights while the liner and light curable resin are positioned in the one or more pipes to aid in curing said light curable resin.

According to at least some aspects and/or embodiments, said plurality of lights comprise LEDs.

According to at least some aspects and/or embodiments, said plurality of lights comprise a pattern of equally spaced LEDs along the length of the liner.

According to at least some aspects and/or embodiments, the liner comprises a non-woven, a woven, or a knitted material.

According to at least some aspects and/or embodiments, the plurality of lights comprises fiber optic strands incorporated into the liner material.

According to at least some aspects and/or embodiments, the system includes a bladder for pressing the resin and liner towards a wall of the one or more pipes.

According to at least some aspects and/or embodiments, the bladder comprises a plurality of lights associated therewith to aid in the curing of the light curable resin.

According to at least some aspects, a method of repairing pipe includes positioning a liner in a pipe to be repairing, said liner including a light curable resin and a plurality of spaced lights along the length of the liner; pressing the liner towards a wall of the pipe with an inflatable bladder; and activating the plurality of lights along the length of the liner at the same time and while the bladder presses the liner towards the wall of the pipe to aid in curing the light curable resin.

According to at least some aspects and/or embodiments, the plurality of lights comprise a plurality of strands of fiber optic lights associated with the liner.

According to at least some aspects and/or embodiments, the light source is located outside of the pipe being repaired by a pipe liner.

According to at least some aspects and/or embodiments, the step of activating the plurality of lights comprises turning on the lights at substantially the same time.

According to at least some aspects and/or embodiments, further comprising removing the inflatable bladder after the light curing resin has cured to leave the liner and lights in the repaired pipe.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
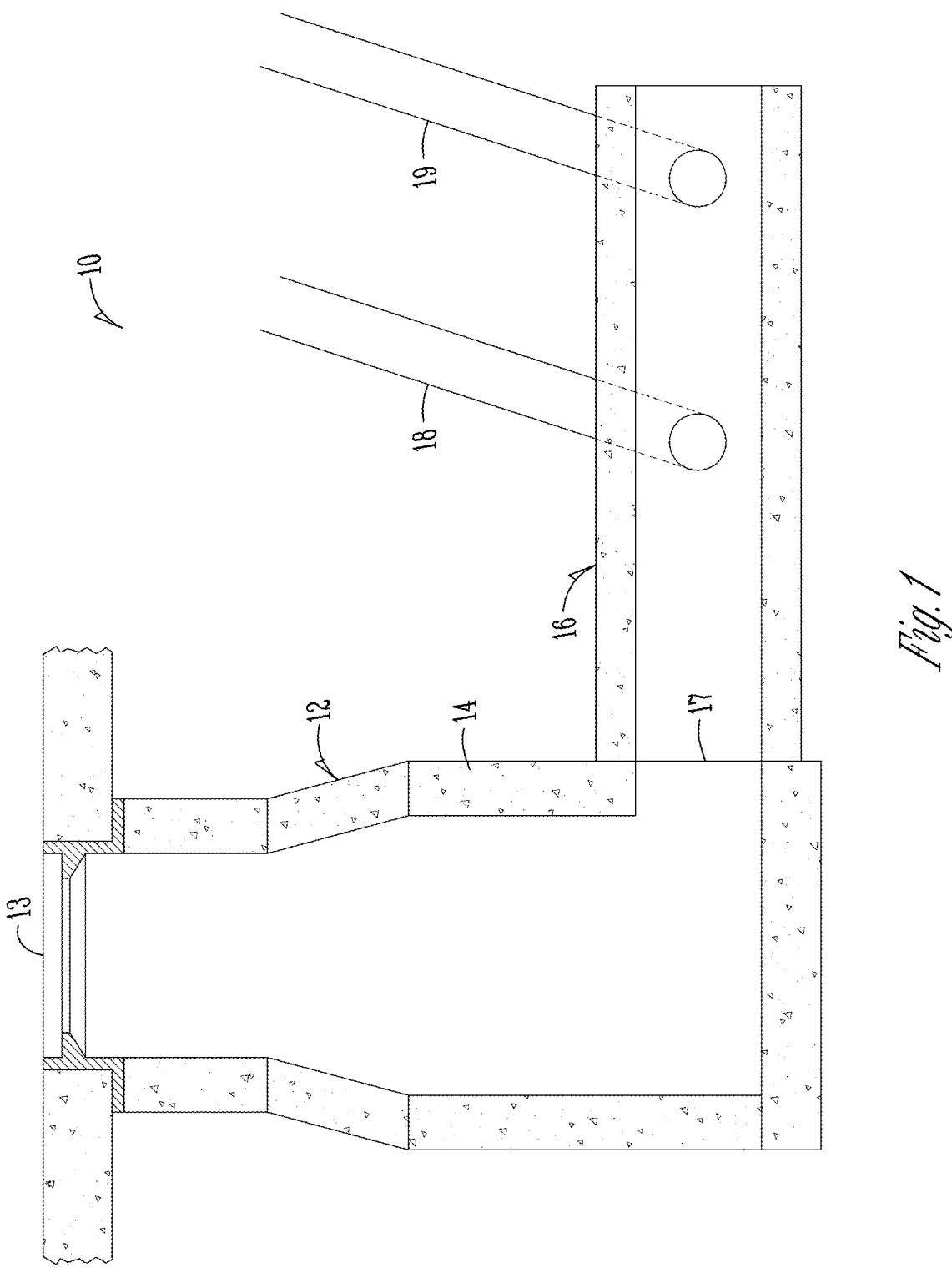
FIG. 1 is a sectional view of an exemplary sewer system including a manhole, main pipe, and multiple service or lateral pipes.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

The terms "pipe system", "main pipe", "lateral pipe", "service pipe", and "cleanout" are intended to mean that which is known in the CIPP industry.

A "pipe liner" is defined as a material that is used to provide a lining to a pipe. Pipe liners include but are not limited to cured-in-place pipe liners, folded liners, or spray-on liners. A "cured-in-place pipe liner" is a fabric capable of holding a resinous material.

A "folded liner" is a material constructed of a thermoplastic, such as High Pressure Polyethylene ("HPPE"), High Density Polyethylene ("HDPE"), Medium Density Polyethylene ("MDPE"), Polyvinyl Chloride ("PVC"), and/or modified PVC that is used to provide a lining to pipes.

A "main liner" or "main pipe liner" is defined as a pipe liner for use inside of a main sewer pipe.

A "manhole liner" is defined as a material that is used to provide a lining to a manhole. Manhole liners include but are not limited to cured-in-place manhole liners, spray-on manhole liners, cementitious manhole liners, cast-in-place manhole liners, and resin manhole liners.

A "cured-in-place manhole liner" is a fabric or textile capable of holding a resinous material and conforming to a manhole structure A "spray-on liner" is defined as a material that is used to provide a lining to a manhole or pipe where the material is sprayed onto the walls of the manhole or pipe.

A "cementitious liner" is defined as a cement material that is used to provide a lining to a manhole. Cementitious liners may usually be sprayed, spread, or otherwise placed onto the walls of the manhole.

A "resin liner" is defined as a resinous material that is used to provide a lining to a manhole. Resin liners may be sprayed, spread, or otherwise placed onto the walls of the manhole.

A "service pipe" is defined as a pipe that is lateral to a main pipe.

The terms "residence", "house", "building", or "other structure" are intended to be used interchangeably as a location to which a service or lateral pipe extends from a main pipe to provide sewer services thereto.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

FIG. 1 is an exemplary sectional view of a pipe system 10. The pipe system 10 includes various components which may comprise an exemplary pipe system. However, it should be appreciated that generally any type of pipe system and/or sewage system such as may be used in infrastructure and municipalities, and which may be in need of or have been repair may be considered as part of the disclosure. The pipe system 10 shown in FIG. 1 includes a manhole 12. The manhole 12 includes an opening or access cover 13 to provide access into the manhole 12. The manhole includes walls 14 forming the structure of said manhole 12. Extending from an opening the 17 in a wall 14 of the manhole 12 is a main pipe 16. The main pipe is a term not to be limiting or meaning anything in particular, and instead is included to refer to a specific pipe in the figures. The main pipe includes walls extending a distance from the manhole 12 and may extend from one manhole to another. Generally extending from the main pipe 16 are lateral pipes 18, 19. The lateral pipes 18, 19 may also be referred to as service pipes or user pipes and extend generally from the main pipe 16 to a building, lot, or other location. For example, the lateral pipes may extend from the main pipe 16 to a dwelling, such as a house, building, place of business, or other structure. The lateral pipes are connected in such a manner that the sewage and other fluids flow from the end location, such as the dwelling, towards the main pipe 16.

Many municipalities include such exemplary pipe systems 10 as shown in FIG. 1, and many of said pipe systems have been in place for an extensive period of time. For example, the pipe systems are generally comprising concrete, vitrified clay, iron, or the like, and the pipe systems can experience wear and tear. Such wear and tear can take many forms, including, while not limited to, freeze and thaw, infiltration of groundwater, leakage of sewage, subsidence, water erosion, corrosion, cracking, settling, rusting, plant root intrusion or other, or the like. Any penetration or opening in a pipe can allow groundwater and soil to enter, which can block or otherwise overload the pipe system. Such damage to the structure of the systems require repair. While one type of repair is to dig up the area in and around the pipes and to structurally replace the pipes, this is very costly, disruptive and intrusive. For example, a large amount of ground must be displaced in order to access the underground pipes, then the pipes must be torn out and replaced, then the ground replaced, and the surface restored. Therefore, many times cured-in-place (CIPP) pipe lining repair is utilized to repair one or more components (pipe or section or pipe) of the pipe system 10.

CIPP pipe repair, such as is disclosed in U.S. Pat. Nos. 9,562,339, 8,550,121, and 9,435,479, which are hereby incorporated by reference in their entirety, includes inverting a resin impregnated liner into a pipe from outside on inside the pipe, such as within an inflatable bladder. For example, when repairing the main pipe 16, the bladder and liner combination may start in the manhole 12 and be inverted into the main pipe 16 via the opening 17. Otherwise, when repairing the lateral pipes 18, 19, access may be started in the manhole or the main pipe. In either repair, little to no ground is disrupted to provide repair to the pipes. The resin impregnated liner can be cured via an ambient curing agent, a heat source which can be circulated hot water, steam/air mixture, or other (e.g., light, such as ultraviolet light). Currently, steam curing is the most widely used process for curing CIPP. The steam aids in speeding up the curing process of the resin saturated liner in order to provide a new pipe within a pipe that significantly extends the service life of the pipe.

Figure 2:
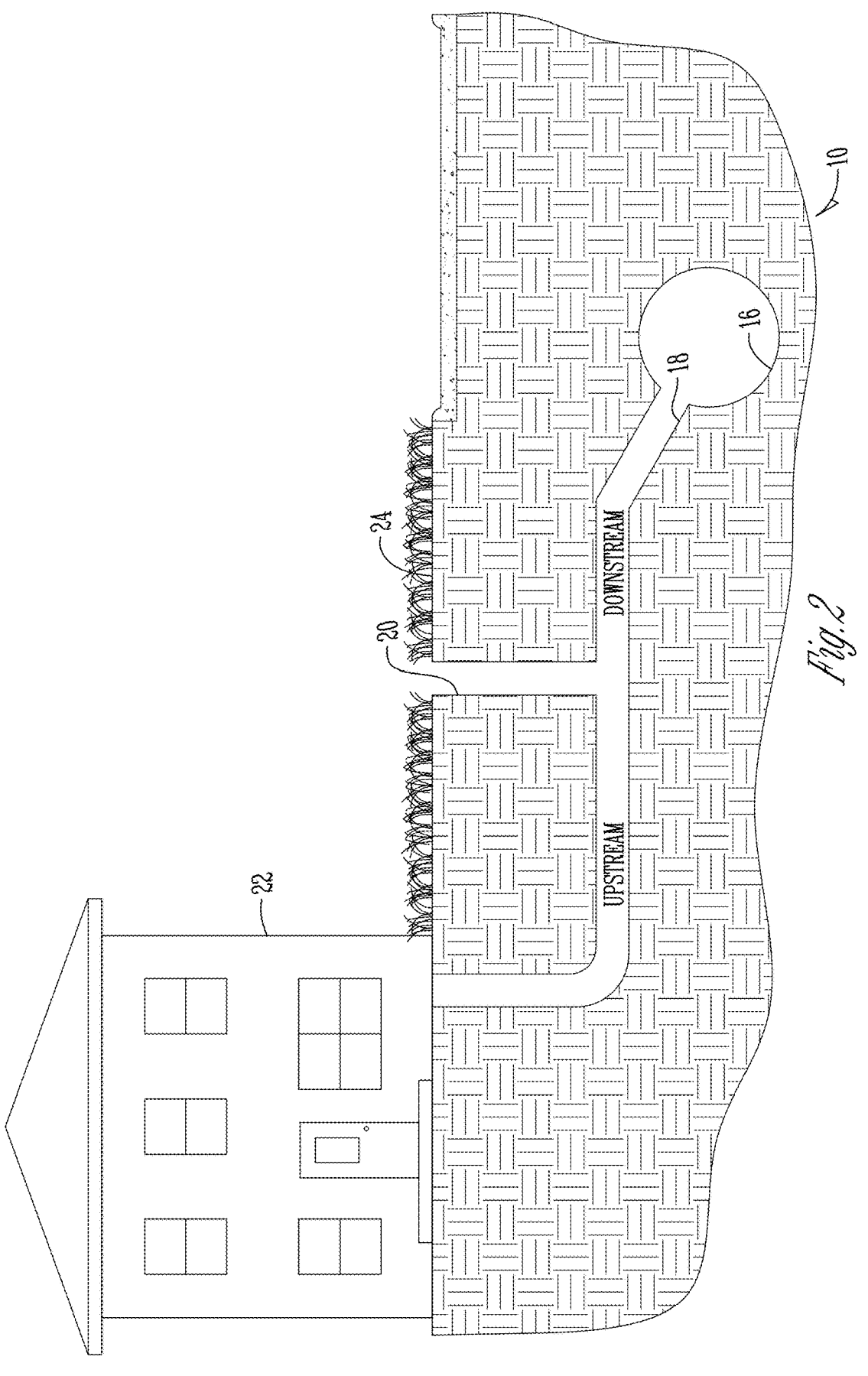
FIG. 2 is a sectional view showing an exemplary pipe system including a main pipe with a lateral pipe extending to a building and a cleanout providing access to the lateral pipe.

FIG. 2 shows another view of a pipe system 10. As shown in FIG. 2, the pipe system 10 includes a main pipe 16, which is appearing to extend transversely to the surface of the figure. A lateral or service pipe 18 is shown to extend from the main pipe 16 and ultimately ending or connecting with a structure 22. The structure may be any structure having a need for sewer connection, including, but not limited to residences, houses, office buildings, commercial buildings, factories, storage buildings, garages, or the like. It should be appreciated that generally any structure having a connection via a pipe system for sewage is to be contemplated. The service or lateral pipe 18 carries material, such as sewage, water, and the like, from the structure 22, through the service pipe 18, and into the main pipe 16.

The main pipe 16 of the municipality may be connected to multiple structures, such as the structure 22 in the figure, via multiple service pipes along the length of the main pipe 16. From time to time, the main pipe 16, and even some or all of the lateral pipe(s) 18, may need to be repaired, and CIPP repair processes and systems are utilized. This allows for the trenchless and minimally invasive repair of a section or entirety of a pipe or pipes, such as by any of the disclosures referenced and incorporated by reference herein. In addition, to provide access to the pipe system 10 as part of the CIPP process, a cleanout 20 may be needed or otherwise dug to provide access to a lateral pipe 18. A cleanout is created by digging a hole or otherwise removing ground 24 (e.g., via a vacuum system), a hole is created in the lateral pipe at the cleanout, and a saddle or other member can be connected, either temporarily or permanently, to the lateral pipe. Such a process and/or system is shown in U.S. Pat. Nos. 6,705,801; 8,454,271; 8,172,482; all of which are herein incorporated by reference in their entirety.

Most service lateral pipes, such as the pipe 18 in the figures, do not have a clean out at the property line (i.e., ground 24). The property line is the point where the public right away meets private property, for example the upstream side of a sidewalk could be a property line in a municipality. The process for installing a cleanout 20 can be practiced using ASTM F3097, whereby a minimally invasive sewer cleanout is installed. ASTM F3097 is hereby incorporated by reference in its entirety and for all purposes. Typically, the cleanout connects to the lateral pipe with a TEE shape, providing access both upstream and downstream of the cleanout (see, e.g., FIG. 2 for depiction of upstream/downstream). For reference, ASTM F3097 provides the standard for minimally invasive cleanout installation that utilizes a saddle and provides the two-way access.

The newly installed cleanout provides two-way access for both upstream and downstream in the lateral pipeline 18 through a T-shaped clean out that is made by using a saddle a pipe saddle, such as that disclosed in any of the referenced and incorporated patents.

The cleanout 20 is used to provide access to the pipe system 10 and to provide additional advantages. For example, equipment, such as an inspection camera, cleaning equipment, and the like, are able to be inserted via the cleanout 20 to prepare the pipe and monitor the repair process from the cleanout. In addition, as mentioned herein, a bladder or plug can be inserted through the cleanout 20 and positioned at a location upstream of the cleanout (such as between the cleanout and the structure) to plug or block sewage and any other material from moving from the structure 22, through the lateral/service pipe 18, and into the main pipe 16. This is important during the CIPP process to ensure that the repair retains structural integrity. Municipalities typically are responsible for the maintenance and rehabilitation for service pipes located in the public right away. Typical practices have included inserting an inflatable sewer plug on the upstream side of the cleanout 20 to prevent or at least mitigate system flow into the portion of the sewer lateral located in the public right of way. This sewer plug (not shown) also prevents or at least mitigates any emissions produced from curing of the thermal-setting resin, which could migrate up the service pipe and enter a home or business (i.e., a structure 22) through a dry plumbing fixture trap. For this reason, it is important that the service lateral be plugged during any pipe rehabilitation processes.

All of the pipes as shown in the pipe system 10 could be in need of repair, and thus, can be repaired utilizing the CIPP process. In such a process, as noted herein, a curable resin, such as a light curable resin, is positioned in the pipe along the length of a wall of the pipe. At times, a bladder, such as an inflatable bladder, may be used to press the resin towards the wall, creating a smooth interior surface once the resin has cured and hardened. Still further, the resin may be positioned using resin absorbent liner, such as a non-woven felt liner, a knitted liner, or a woven glass liner. With a liner, the resin is impregnated into the liner, which provides a conduit to position the light curable resin in place in the pipe. The bladder can then be used to press the liner/resin towards the wall, wherein the liner cures in place with the resin to create the "new" interior wall of the pipe.

To help speed up the process for the curing of the resin, an activant, such as light, can be introduced in the pipe system while the bladder is pressing the resin towards the wall of the pipe. The light cures the resin, which reduces the cure time as compared to other curing methods. As noted, this can be done with a light train that is moved through the pipe. However, as the resin needs to be exposed to the light for a minimal amount of time, this still takes a long time. Further, it is difficult to remotely insert a light train into a lateral pipe from the main pipe.

Therefore, aspects and/or embodiments include systems, methods, and/or apparatus to aid in the curing of the resin in a shorter amount of time. Accordingly, at least some aspects and/or embodiments include a liner comprising a plurality of lights therein. The liner, as is known from U.S. Pat. Nos. 5,501,248 and 8,616,243, which are hereby incorporated by reference in their entirety, may be knit or woven. In addition, the liner may include a scrim.

As such, aspects and/or embodiments of the invention include the use of lights, such as fiber optic lights, that are interwoven, knit, or otherwise associated with the liner. For example, luminous optical fiber textile LED fabric technology materials may be used. The textile could be included as a layer of the liner or could be used with a felt or other woven material to form the liner as an integral piece. Other LED fabric lights could also be used. The fabric lights provide a light source for the liner, which is used to help in speeding up the curing process for the light curable resin. Otherwise, the lights could be strung or otherwise positioned with the liner, such as in a pattern, to provide light along the length of the liner.

The fiber optic lights, according to any of the aspects and/or embodiments of the present disclosure, may include cladding. As is known with fiber optics, cladding is generally used to direct the light through the fiber, wherein the cladding is not light absorbing and directs the light through the fiber line. In any of the embodiments herein, the fiber optic lights may include at least some cladding or other reflective materials to aid in moving the light through the pipe, such as at or near the location where the resin is positioned, so as to best utilize the light for curing the resin.

Still further, it is envisioned that the fabric may be positioned along the full length of the liner that is used to repair a pipe. This can be in any form, such as including, but not limited to, a main pipe liner, a lateral liner, a T- or Y-shaped liner, or a liner used to repair a manhole.

As further is noted, the liner could comprise a glass liner that is used as a conduit for the resin. In such a configuration, the light structure could be in the form of a string of LED lights, such as a fiber optic strand, which is woven into the glass liner or otherwise associated with the liner. The fiber optic housing could comprise glass strands, which could be oriented to provide structural reinforcement to the liner. In addition, the fiber optics could comprise a plastic housing or construction, which would allow for flexibility of the liner/light structures. Such a plastic construction would allow for the liner to be inverted into the pipe, instead of pulled in place or pushed into the pipe.

It should also be understood that the liner and light combination will include a power source, which can be integrated with the liner or can be remote, such as outside the pipe system. The power supply outputs a particular voltage to a device or component or components of a device. The power supply could be a direct current ("DC") power supply (e.g., a battery), an alternating current ("AC") power supply, a linear regulator, etc. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH") battery, a nickel-cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

The power source is used to selectively activate the lights associated with the liner. The power source could be manually activated or remotely activated, such as via an app or remote power means to turn on/off. Such an app can be a handheld remote, a switch, a tablet, a phone, or generally any other device that includes a switch by way of turning on and off power to the light system.

Figure 3:
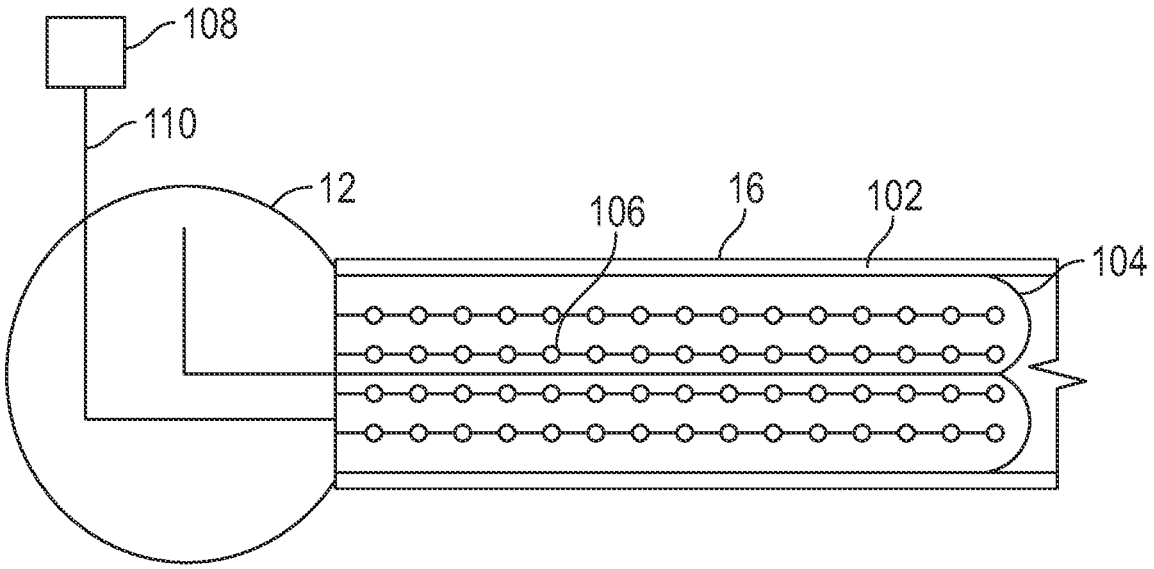
FIG. 3 is a sectional view of a portion of a pipe system showing the positioning on a liner in the pipe and pressed towards the walls of the pipe and including a plurality of lights for curing a light curable resin associated with the liner.

An exemplary depiction of a lighted liner is shown in FIG. 3. It is noted that the figure shows a section of a main pipe 16, but this could be any pipe section that is repaired using a liner and CIPP process. FIG. 3 shows a repair system 100 in the main pipe 16. The liner 102 has been positioned in the pipe by way of inversion. An inflatable bladder 104 can be used with the liner 102 to invert said liner 102 into the pipe 16. The bladder 104 can be inflated to then press the liner 102 towards the wall of the pipe 16 until a resin associated with the liner has cured, creating a new interior wall of the pipe. The bladder 104 can then be removed.

As further shown in FIG. 3, the liner 102 includes a plurality of lights 106 in addition to the light curable resin. The lights 106 may be fiber optic lights in a strand, LED fabric lights, or other LED textile lights. The lights may be in a strand or otherwise patterned around the liner. The lights, whether fabric, strands, of individually placed, are positioned along the full length of the liner being used to repair the pipe.

For example, the liner 102 itself could be made fully of or substantially of a fiber optic textile material, such as fiber optic glass in the form of a fiber optic fabric. The fiber optics fabric is made of ultra-thin optical fibers, directly woven with synthetic fibers. The optical fibers are specially processed in order to allow the light to be emitted along the full length of the fibers (side emitting fibers). The optical fibers are then connected to ultra-bright LEDs (embedded in borders at the edge of the fabric), which inject light into the fabric. This liner can then be saturated or otherwise associated with the light curing resin, wherein the resin will be cured by the light from the fiber optic fabric while in the pipe being repaired.

FIG. 3 also shows the lights 106 connected to a power source 108. In the figure, a cable 110 is shown to connect the lights 106 to the power source 108. However, as indicated, the power source could be integral with the liner as well and activated remotely. The power source turns the lights 106 on/off on a selective manner. It should be further noted that the powered light source can be located outside the pipe above ground such as a light or laser beam that passes through a light illuminating fiber or an array of fibers. In this way there is no electricity in the pipe which promotes safety and reduces the risk of damage to electric cables that can short out. In addition, it should be noted that any cable or cord within the liner and/or bladder can be translucent such that it does not block any of the light being used to cure the resin therein.

Therefore, once the liner 102 has been positioned in the pipe 16, and the bladder has been inflated, the power source 108 can be activated to turn on the lights. This will cause all of the lights along the length of the liner to turn on at the same time, providing an activant to speed up the curing process for the resin associated with the liner. Thus, the full length and area of the liner 102 can be cured at substantially the same time. This will greatly reduce the amount of time needed to cure the length of the pipe, which reduces the repair time and allows for more repairs to be made. Further, the resin promoted with a light initiating catalyst provides extended shelf life which is an advantage in underground pipe repair, one that avoids liners prematurely curing during liner installations. Once the resin has cured along the length of the liner, the bladder can be removed and the liner/resin/lights can remain in the pipe as a new, repaired interior wall of the pipe.

In addition, or in an alternative embodiment, the bladder 104 could also include lights, such as fiber optic LEDs, along the length of the bladder to provide the light to aid in the curing of the resin. Still further, when a scrim is used to reinforce a liner, the lights could be incorporated into the scrim to provide the light needed for the curing of the light curable resin. While the lights have generally identified as LED lights, it should be appreciated that generally any type of lighting could be used. Nonlimiting examples of artificial lighting include incandescent lamps, halogen lamps, parabolic aluminized reflector lamps, fluorescent lamps, electrodeless or induction lamps, laser lamps, light emitting diode ("LED") lamps, electron-stimulated luminescence lamps, blue lights, combustion-based lamps (e.g., gas lamps, oil lamps), arc lamps, gas discharge lamps, and high-intensity discharge (HID) lamps.

In addition, it should be appreciated that any of the embodiments and/or aspects disclosed herein, including any of the types of lights or light systems, could include the use of lenses to aid in dispersing the light in a manner that will best cover or otherwise direct the light towards the resin. The lenses could be used to attempt to direct light from single light points to cover a larger area of the resin, which will allow for fewer lights to be required.

According to at least some aspects and/or embodiments of the disclosure, light, such as rays from the sun, could be directed, such as via mirrors or other reflective surfaces, into the pipe being repaired. The light could be directed into a bladder, which could comprise fibers with at least some cladding to carry and transport the light rays through the bladder and towards the resin in the pipe. This would create a situation in which the bladder itself is, in a sense, a large fiber optic line. In any of the embodiments and/or aspects, the bladder could include cladding or partial cladding to direct the light towards the resin in the pipe, such as at the wall or in the liner. The liner could also include cladding, or partial cladding, which will direct the light moving through the fiber optics or other light systems to focus more intensely towards the resin in the pipe. For example, the cladding could cover a portion of the liner that faces the resin, and there could be apertures or openings in the cladding. Lenses may be included at the openings to disperse the light to best cover as much as the resin as desired, which will help cure the resin in the pipe.

The use of the lights with a liner, bladder, and/or scrim provides numerous advantages and improvements. As the lights will be positioned along the full length or area of the pipe being repaired, the resin will be cured at substantially the same time, which will aid in the structural integrity of the repaired pipe. The location of the lights at or near the location of the resin, such as in the liner, will also provide the best location for speeding up the curing process as well.

This is especially advantageous when the resin or liner is thicker, as the close proximity for the lights will be best used. As fiber optic lights are small in nature, they will not affect the flow of material through the pipe once it is reinstated, either.

The lighted fiber could also be left in the repaired pipe, such as for later illumination. For example, after pipes are repaired, they may need to be viewed at a later time, such as during an inspection. The lighted fiber optics that comprise the liner used to carry the curable resin could be turned on to allow for better visuals at the inspection. This could also be beneficial if any patching, repairs, or reasons for viewing inside the repaired pipe.

Still additional benefits of the fiber optics could be that the fibers could be used to sense temperature in the pipe, such as during curing. The fiber optics could also be used to detect seismic movement in the pipe.

In addition, the light strands including the fiber optics could comprise glass or plastic. The glass would provide structural integrity, such as when the strands of glass are oriented. The use of plastic housing for the fiber optics may provide greater flexibility, such as when then liner is inverted or when the liner is a T- or wye-shaped liner so that the lights can cover the area around a juncture for the pipe.

Figure 4:
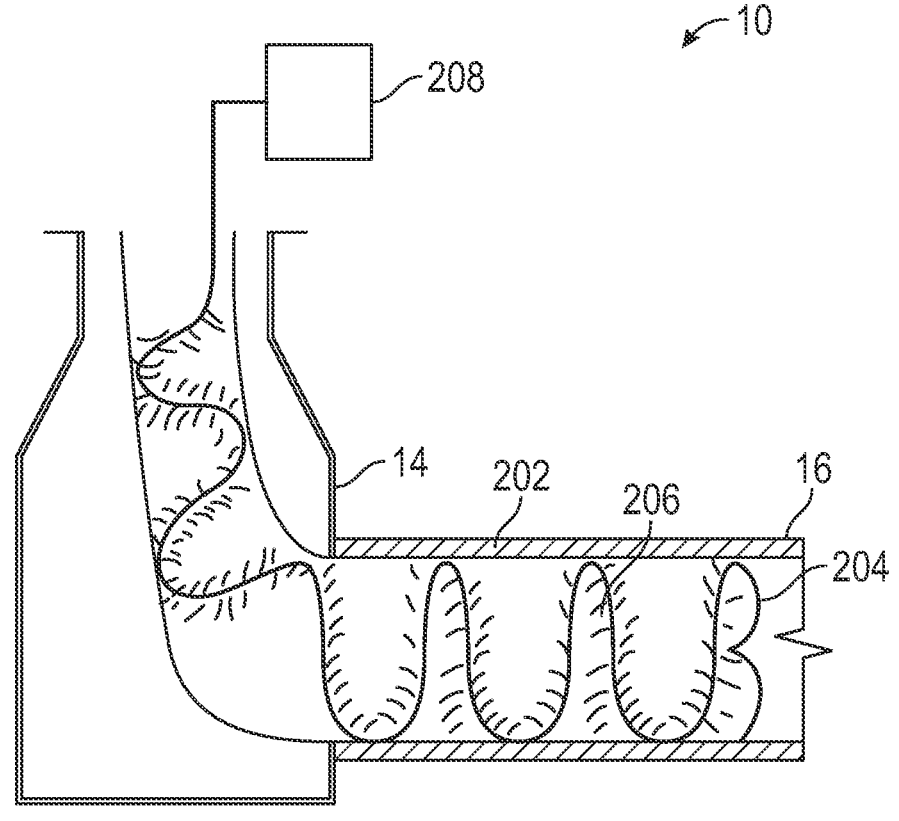
FIG. 4 is a sectional view of a pipe system showing the use of light diffusing fibers positioned in the pipe to aid in curing a resin for a CIPP process.

According to at least some additional aspects of at least some embodiments, instead of using a liner or bladder comprising electronic lighting, light diffusing fibers could be used to provide light to cure the resin in the pipe during repair. Such a depiction is shown in FIG. 4. As shown in the figure, the pipe system 10 is being repaired with an inverting bladder 204 and a corresponding liner 202 that includes a resin capable of curing and hardening. The resin may be a light curing resin. In at least some embodiments, the liner may comprise felt, fiberglass, or other known materials. However, to avoid the need for the use of heat to cure the resin, the figure shows the addition of a light diffusing fiber 206, which is positioned about the interior of the liner/bladder combination.

Figure 5:
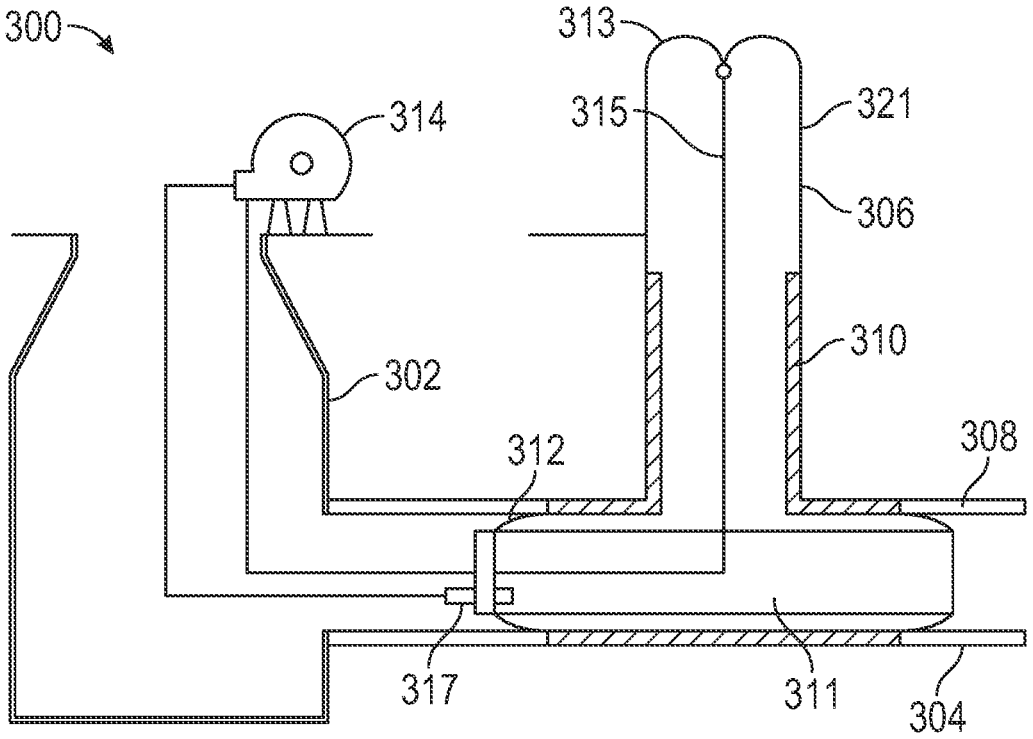
FIG. 5 is another sectional view of a pipe system showing the positioning of a bladder and liners in the pipe system to repair the same.
Figure 6:
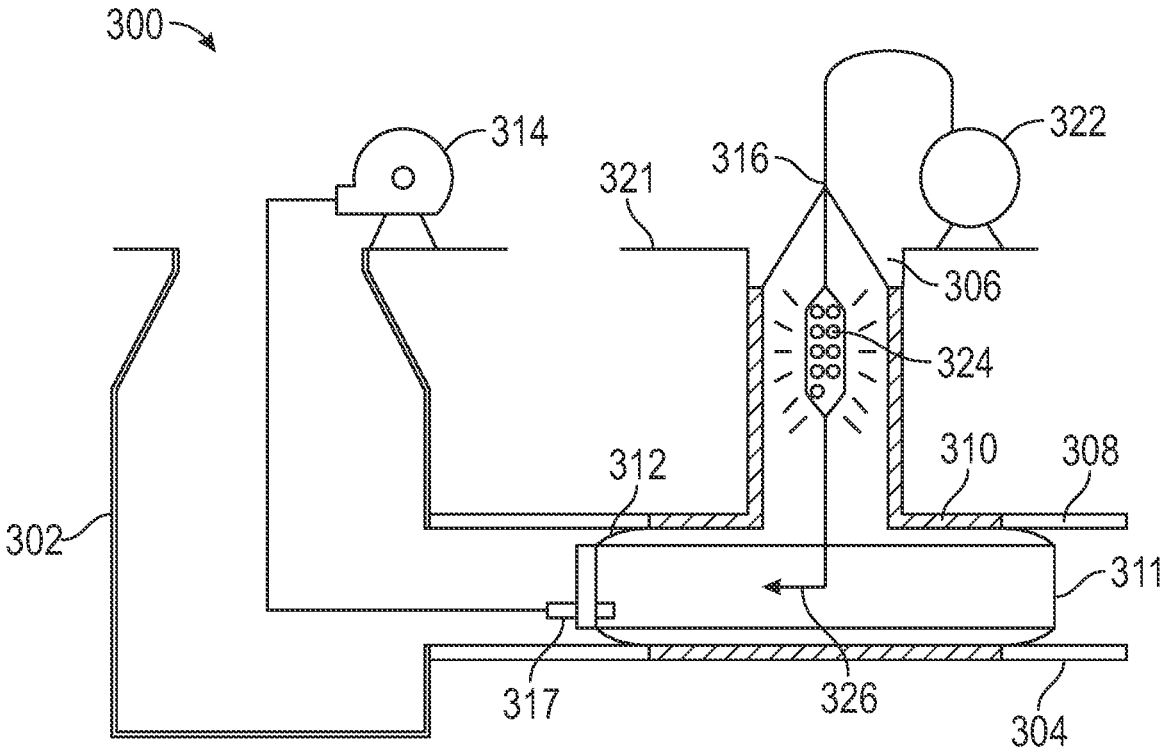
FIG. 6 is a view similar to FIG. 5 but showing the introduction of a light system at an inverting end of the bladder, wherein the lighting system is used to speed up the curing time of the resin associated with the liner.

It should be noted that the figure is a depiction of a portion of a main liner 16 being repaired, but the same or similar elements could be used for lateral pipes, such as using T-liners and associated launchers (see, e.g., FIGS. 5-6).

One example of light diffusing fiber is Corning® Fibrance® fiber. This optical fiber was created from a unique glass for maximum flexibility-allowing you to bend, curve and wrap it around almost anything, while maintaining bright, beautiful, and uniform light. The Fibrance® fiber is a glass optical fiber with enhanced performance. The technology enables it to be embedded into tight or small spaces, such as the interior of a pipe being repaired using the CIPP process. The fiber is a bright, clear color that emits continuous, uniform light. Thus, the fiber 206 could be incorporated with the liner and/or bladder in a number of ways, such as coiling the light about the interior will provide the best emittance to provide illumination to as much of the resin as possible to reduce the amount of time for curing of the same.

There are numerous benefits to including a light diffusing fiber, such as that disclosed, in order to cure the resin. Such a diffusing fiber would mitigate or even eliminate the use of electronics in the pipe under repair. The diffusing fiber promulgates light from outside the pipe to the interior for curing the resin. This includes a light source 208, such as mirrors to reflect sunlight, lamps, or other source is positioned externally of the pipe. The light from the source is promulgated about the diffuser fiber 206 that is positioned within the bladder and/or liner in the pipe. The fiber, being flexible, is able to reach all of the areas of the pipe under repair to provide the necessary light for curing of the resin therewithin.

Still further, it should be appreciated that the fiber 206 could be a single fiber or a plurality of fibers placed in the pipe to diffuse and promulgate the light from the external source, so as to provide the illumination in the pipe. It should also be appreciated that the fiber could be used before or after the repair to provide illumination for the inspection of a pipe or pipes of a pipe system. The benefits of providing light without requiring electricity in the pipe are numerous.

FIGS. 5 and 6 show additional aspects of at least some embodiments of the present disclosure. As shown in the figures, a pipe system 300 includes a manhole 302, a main pipe 304, and a lateral pipe 306 extending from the main pipe. For purposes of illustration, the main pipe 304 has been repaired using the CIPP process and includes a new interior wall in the form of a liner 308. The lateral pipe 306 is also being repaired using CIPP systems and may include a T-liner 310 being launched from a launcher 311 at the junction of the main and lateral pipes. The liner 310 then extends up the lateral pipe to a location outside the pipe.

The figures further show the use of a bladder 312 extending around and from the launcher 311 for pressing the liner 310 and resin against the walls of the lateral pipe. The bladder 312 includes a fan or other inflation source 314 that is used to inflate and move the bladder and liner through the pipe system 300, such as the lateral pipe 306 (in the figure, the main pipe 304 has previously been repaired and lined with the main line liner 308). An air inlet 317 connects the air source 314 and the launcher 311 and bladder 312. In addition, a cable 315 is connected to the bladder 312. The bladder 312 has an inverting end 313, which is distal from the launcher 311. As shown in FIG. 5, the inverting end or face 313 has reached a point external of the pipe system, such as at or above ground level 321. The inflation will be maintained in the bladder until such time that the resin has cured in the pipe. At that point, the bladder can be removed from the system. Thus, the bladder is not remained in the pipes.

As has been discussed throughout the present disclosure, light can be added to the interior of the pipes to speed up the curing and to reduce the repair time for the CIPP process. It is known to introduce light using LED lights on a packer system that moves through the pipe. For example, the LightRay system is a light cure CIPP technology, allowing complete operator control of the curing process. The LightRay systems move a light train through the inflated pipe liner, and often using the inflation pressure to invert the liner and/or bladder and drag the light train into the interior of the liner. This results in too much air pressure in the liner system, which can cause quality issues related to the pipe repair. For example, this can cause the liner to stretch longitudinally and result in inconsistencies in the thickness of the resin and/or liner in the pipe, which affects the structural stability of the repaired pipe.

Another system that uses lights is known as the Bluelight LED. The Bluelight LED system includes a lighted head that is moved through the CIPP system in the same direction as the inversion of the bladder and/or liner in the pipe.

Still another system used to introduce light into CIPP repair systems is referred to as SpeedyLight. The SpeedyLight system includes a light train comprising LEDs and moved through a pipe to cure resin associated with a liner, such as a felt liner, in the pipe. The device is disclosed in U.S. Pat. No. 10,337,659, which covers the lighted end or train of the system, and therefore, could be used as the light train referenced herein.

As noted, there are numerous issues with using any of the known lighting systems. Therefore, FIG. 6 shows improvements to such a system. FIG. 6 is similar to FIG. 5 in having the bladder extending to a portion external 321 of the pipes. The pressure is maintained in the pipe via the bladder 312. However, to aid in the light curing of the resin in the pipe, a light train system is provided at the inverting end 313 of the bladder 312. However, the inverting end 313 is closed to allow for inflation, normally. To insert the light train 324, a portion of the bladder at the external, distal end thereof is opened and clamped, pinched off, or otherwise configured to mitigate air from leaking. This maintains the pressure in the bladder 312. An opening is made at the inverting end of the bladder. The light train 324 of the light system is placed in the now open, distal end of the bladder 312 and the bladder is closed tight around any portion of the light system to mitigate air from leaking or otherwise leaving the bladder. It should be noted that, while the term light train 324 is used, this can refer to any sort of light being positioned in the pipe, such as light trains, lights, packers with lights, or lighted head members. The term should not be limiting to the disclosure.

The light 324 is then moved in the opposite direction of inversion of the liner and/or bladder, The direction of movement of the light 324 is shown by the arrow 326 in FIG. 6. This will reduce the amount of air pressure required to invert the liner and be at a minimum required pressure. The light can be moved physically without the need for air to move the train, which lessens the pressure requirements in the pipe system so that the liner is not overstressed, and resin can cure as desired. The light train 324 will continue through the bladder 312 to aid in curing the resin in the liner to complete the repair. It is current practice to attach a rope 315 to the end of the liner or bladder to aid in controlling inversion speed of the liner and/or bladder, and the removal of the bladder. It should be noted that the rope 315 can cause a shadow whereby the light will not cure the resin where the rope is between the light and the resin. Therefore, it is noted that the rope can be made of a clear or translucent material such as a glass strand rope or similar material to allow the light to pass therethrough.

The length and/or size of the light train 324 should not be limiting to the present disclosure, and anything sufficient to aid in the curing of the resin in the liner will suffice. The amount of time that is required for the curing of the resin via the lighting system 320 will also not be limiting, as it will vary on the resin and other factors known. However, having the light train 324 be illuminated via the light source 322 and moved the opposite direction as compared to the inversion of the bladder will reduce the pressure needs and lessen the time for curing.

The light train 324 comprises cold LED lights (of any suitable wavelength) to minimize the heat during the curing in the pipe. The train can be flexible to account for bends include 90-degree angle corners in a pipe system. In addition, while the system has referred to a light train 324, it should be appreciated that the system could include a side illuminating fiber, an elongated light train, a lighted head, or some combination. The process includes the introduction of the lights via the inverting end of the bladder instead of at the entrance of the bladder, which again reduces the need for excess inflation, which provides for a better curing and consistent inner wall of the pipe system being repaired.

As noted, a launcher is used in the lining of a lateral and the adjacent main pipe connection area (see, e.g., FIGS. 5-6). In the case of using light to cure the liner it is necessary to cure the main portion which it typically 18" in length and covers the full circumference of the main pipe at the lateral connection. In such a configuration, the launching device can be made of a clear or translucent material that will allow the light to penetrate and cure the resin saturated liner in the main pipe. This is accomplished as the light head is inserted from the cleanout or otherwise external of the lateral pipe and extends into the launcher (see the arrow in FIG. 6) illuminating the main liner section at the lateral connection. This could also be accomplished as a fiber optic strand or strands or other lighting such as Speedy Light is inserted through the launcher and is either pulled up into the bladder by attaching the light to the tail end of the bladder, or by pushing the light up through and into the bladder to cure the liner.

Another feature according to at least some aspects of some embodiments of the present disclosure is that there is no light train attached to the liner and/or bladder. This is advantageous because in the case of the light ray, as soon as the liner is inverted from the main into the lateral pipe and the lights are now pulled by the inverting bladder into the inside of the bladder, and should the lights not work, there is not a remedy to cure the resin or resolve the situation. There is no way to cure the liner, not even from the cleanout because the end of the bladder is closed, and the light train is inside of the bladder. Most likely this would require an excavation to remove the liner due to the failed light train. However, in the case where the light is inserted through a cleanout on a push rod like that of Speedy Light, and the light fails, a new light can be inserted.

Still further embodiments and/or aspects of the present disclosure could include the use of water to transfer a light source through a liner, bladder, or pipe generally in which the system includes a light curable resin. For example, if a liner or bladder is filled with circulating or moving water, a light can be transmitted through the moving water to aid in curing the resin. The water may include reflective materials to direct the light towards the resin. The water could include bleach, or the fiber optic itself could include bleached water to aid in moving the light and directing the same for best curing of the resin.

Therefore, aspects and/or embodiments have been shown and described that incorporate a plurality of lights, such as via fiber optic light strands, with a system for repairing a pipe of a pipe system. The lights could be included with the liner and/or bladder, or even with a scrim used to reinforce the liner. The lights will include or be connected to a power source that allows for the selective activation of the lights, such as once the liner/bladder has been fully positioned in the pipe or pipes. The power source can be located outside of the pipe and can be activated remotely, such as wirelessly, from outside of the pipe system in order to activate the lights in the pipe to aid in the curing of the resin in the pipe(s). The lights are spaced about the full length and area of the liner to substantially cure the resin at the same time in the pipe, which will reduce the amount of time needed for the resin to cure and providing common curing about the length of the repaired pipe via the liner and resin.

From the foregoing, it can be seen that the invention accomplishes at least all of the stated objectives.

The invention claimed is:

1. A system for repairing one or more pipes of a pipe system, comprising:

a liner, said liner comprising one or more strands of fiber optic lights associated therewith; wherein the liner and the one or more strands of fiber optic lights are integral with one another;

a light curable resin associated with the liner; and a power source for activating the one or more strands of fiber optic lights while the liner and light curable resin are positioned in the one or more pipes to aid in curing said light curable resin.

2. The system of claim 1, wherein the one or more strands of fiber optic lights are attached to or woven into the liner.

3. The system of claim 1, wherein the one or more strands of fiber optic lights extend substantially the same length as the liner.

4. The system of claim 1, further comprising an inflatable bladder for pressing the liner and light curable resin towards a wall of the one or pipes.

5. The system of claim 4, wherein the bladder comprises one or more strands of fiber optic lights along the length of the bladder to aid in the curing of the light curable resin.

6. The system of claim 1, wherein the one or more strands of fiber optic lights comprise plastic.

7. A system for repairing one or more pipes of a pipe system, comprising:

a liner comprising a plurality of lights spaced along a length of the liner, said liner and the plurality of lights being integral with one another;

a light curable resin associated with the liner; and a power source for activating the plurality of lights while the liner and light curable resin are positioned in the one or more pipes to aid in curing said light curable resin.

8. The system of claim 7, wherein the liner comprises a woven material.

9. The system of claim 8, wherein the plurality of lights comprises fiber optic strands woven into the liner material.

10. The system of claim 7, further comprising a bladder for pressing the resin and liner towards a wall of the one or more pipes.

11. The system of claim 10, wherein the bladder comprises a plurality of lights associated therewith to aid in the curing of the light curable resin.

12. A method of repairing pipe, comprising:

positioning a liner in a pipe to be repairing, said liner including a light curable resin and a plurality of spaced lights along the length of the liner;

wherein the plurality of spaced lights are integral with the liner;

pressing the liner towards a wall of the pipe; and activating the plurality of lights along the length of the liner at the same time and while a bladder presses the liner towards the wall of the pipe to aid in curing the light curable resin.

13. The method of claim 12, wherein the plurality of lights comprise a plurality of strands of fiber optic lights associated with the liner.

14. The method of claim 12, further comprising removing the inflatable bladder after the light curing resin has cured to leave the liner and lights in the repaired pipe.

15. A system for repairing one or more pipes of a pipe system, comprising:

an inflatable bladder, said bladder including a plurality of light illuminating fibers spaced along a length of the bladder, wherein the bladder and the plurality of light illuminating fibers are integral with one another;

a light curable resin being positioned in a pipe and pressed by the bladder towards a wall of the one or more pipes; and a power source for activating the plurality of light illuminating fibers while the bladder and light curable resin are positioned in the one or more pipes to aid in curing said light curable resin.

16. The system of claim 15, wherein the plurality of light illuminating fibers comprise fiber optic lights.

17. A method for repairing a portion of a main pipe and a lateral pipe extending therefrom, the method comprising:

positioning, via a launching device, a liner comprising a light curable resin in the portion of the main pipe and the lateral pipe;

pressing the liner against the portion of the main pipe and the lateral pipe with an inflatable bladder, said inflatable bladder having a length longer than the lateral pipe;

opening the inflatable bladder while the inflatable bladder is under pressure and pinching or clamping the opened portion of the inflatable bladder to maintain pressure therein;

inserting a light into the pinched or clamped portion of the bladder and moving the light through the liner and inflatable bladder to cure the light curable resin;

wherein the launching device allows the light to penetrate and cure the light curable resin in the main pipe.

18. The method of claim 17, further comprising sealing the opened end of the bladder to mitigate air leakage and to maintain pressure.

19. The method of claim 17, wherein said launching device is substantially clear to allow the light to pass through.

* * * * *